United States Patent
Taft et al.

(10) Patent No.: US 7,546,025 B2
(45) Date of Patent: Jun. 9, 2009

(54) MEDIA PROJECTOR SYSTEM

(75) Inventors: Frederick D. Taft, Corvallis, OR (US); Kenneth H. Bronstein, Corvallis, OR (US); David H. Ochs, Corvallis, OR (US); Bruce A. Stephens, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 10/885,395

(22) Filed: Jul. 6, 2004

(65) Prior Publication Data
US 2006/0008240 A1 Jan. 12, 2006

(51) Int. Cl.
H04N 7/26 (2006.01)
G03B 21/00 (2006.01)

(52) U.S. Cl. .................. 386/124; 386/46; 353/31

(58) Field of Classification Search .......... 386/111, 386/124, 125; 353/31
See application file for complete search history.

(56) References Cited

U.S. PATENT DOCUMENTS

| | | | |
|---|---|---|---|
| 5,408,284 A | 4/1995 | Berger et al. | |
| 5,815,631 A * | 9/1998 | Sugiyama et al. | 386/46 |
| 5,847,748 A | 12/1998 | Laughlin | |
| 6,347,186 B2 | 2/2002 | Watanabe | |
| 6,472,828 B1 | 10/2002 | Pruett et al. | |
| 6,476,560 B2 | 10/2002 | Terami et al. | |
| 6,522,419 B1 | 2/2003 | Ko | |
| 6,543,900 B2 | 4/2003 | Noji et al. | |
| 6,549,503 B2 | 4/2003 | Matos | |
| 6,626,543 B2 | 9/2003 | Derryberry | |
| 6,698,898 B2 | 3/2004 | Terami et al. | |
| 6,709,115 B2 | 3/2004 | Chimura et al. | |
| 7,093,940 B2 * | 8/2006 | Kubo et al. | 353/69 |
| 2002/0008850 A1 | 1/2002 | Noji et al. | |
| 2002/0105624 A1 | 8/2002 | Quori | |
| 2002/0135324 A1 | 9/2002 | Fujii et al. | |
| 2002/0175915 A1 | 11/2002 | Lichtfuss | |
| 2003/0061607 A1 * | 3/2003 | Hunter et al. | 725/32 |
| 2003/0065806 A1 | 4/2003 | Thomason et al. | |
| 2003/0095237 A1 | 5/2003 | Terami et al. | |
| 2003/0123857 A1 * | 7/2003 | Egawa et al. | 386/111 |
| 2003/0202160 A1 | 10/2003 | Chimura et al. | |
| 2003/0223049 A1 | 12/2003 | Ohara | |

(Continued)

FOREIGN PATENT DOCUMENTS

DE 3427711 A1 1/1986

(Continued)

OTHER PUBLICATIONS

Brochure entitled "Control System for Exhibit Projector" IBM Technical Disclosure Bulletin, Jul. 1972, p. 401.

(Continued)

Primary Examiner—Thai Tran
Assistant Examiner—Mishawn Dunn

(57) ABSTRACT

A system comprising a media player configured to play media content, a projector operatively coupled to the media player, and a control unit operatively coupled to the media player and the projector is provided. The control unit is configured to determine whether the projector is ready for operation, and the control unit is configured to prevent the media player from playing the media content until the projector is ready for operation.

16 Claims, 5 Drawing Sheets

U.S. PATENT DOCUMENTS

| | | | |
|---|---|---|---|
| 2004/0001163 A1 | 1/2004 | Park | |
| 2004/0017548 A1 | 1/2004 | Denmeade | |

FOREIGN PATENT DOCUMENTS

| | | |
|---|---|---|
| EP | 0560125 | 9/1993 |
| EP | 1197794 | 4/2002 |
| EP | 12880344 | 1/2003 |
| FR | 2627925 | 9/1989 |
| JP | 56081826 | 7/1981 |
| JP | 59037534 | 3/1984 |
| JP | 62256024 | 11/1987 |
| JP | 62296126 | 12/1987 |
| JP | 63235923 | 9/1988 |
| JP | 04151507 | 5/1992 |
| JP | 04319930 | 11/1992 |
| JP | 05088256 | 4/1993 |
| JP | 05113604 | 5/1993 |
| JP | 08065612 | 3/1996 |
| JP | 2001057295 | 2/2001 |
| JP | 2002328429 | 11/2002 |
| JP | 2003330115 | 11/2003 |
| KR | 2003-031296 | 10/2001 |
| WO | WO02/076107 | 9/2002 |
| WO | WO03062773 | 7/2003 |

OTHER PUBLICATIONS

Brochure entitled "Movie Projector" IBM Technical Disclosure Bulletin, Jan. 1970; p. 1283.

"Mirage SIM" [http://www.christiedigital.com/products/jproducts.asp?Port=4&ProdPartNo=38-DMD028-01].

* cited by examiner

MEDIA PROJECTOR SYSTEM

BACKGROUND

Digital projector systems that are configured to display images on a screen typically include a relatively high-power lamp. The lamp serves as a light source that is modulated to project the images onto the screen. The lamp is often turned on some time before the projector begins displaying images to allow the lamp to reach its full power output. During this warm-up period, a projector may not be able to fully display images onto a screen. Any video associated with video signals that are input to the projector prior to the projector lamp being warmed-up may not be displayed. As a result, a viewer may not see portions of a video prior to the projector lamp being warmed-up.

SUMMARY

One form of the present invention provides a system comprising a media player configured to play media content, a projector operatively coupled to the media player, and a control unit operatively coupled to the media player and the projector. The control unit is configured to determine whether the projector is ready for operation, and the control unit is configured to prevent the media player from playing the media content until the projector is ready for operation.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
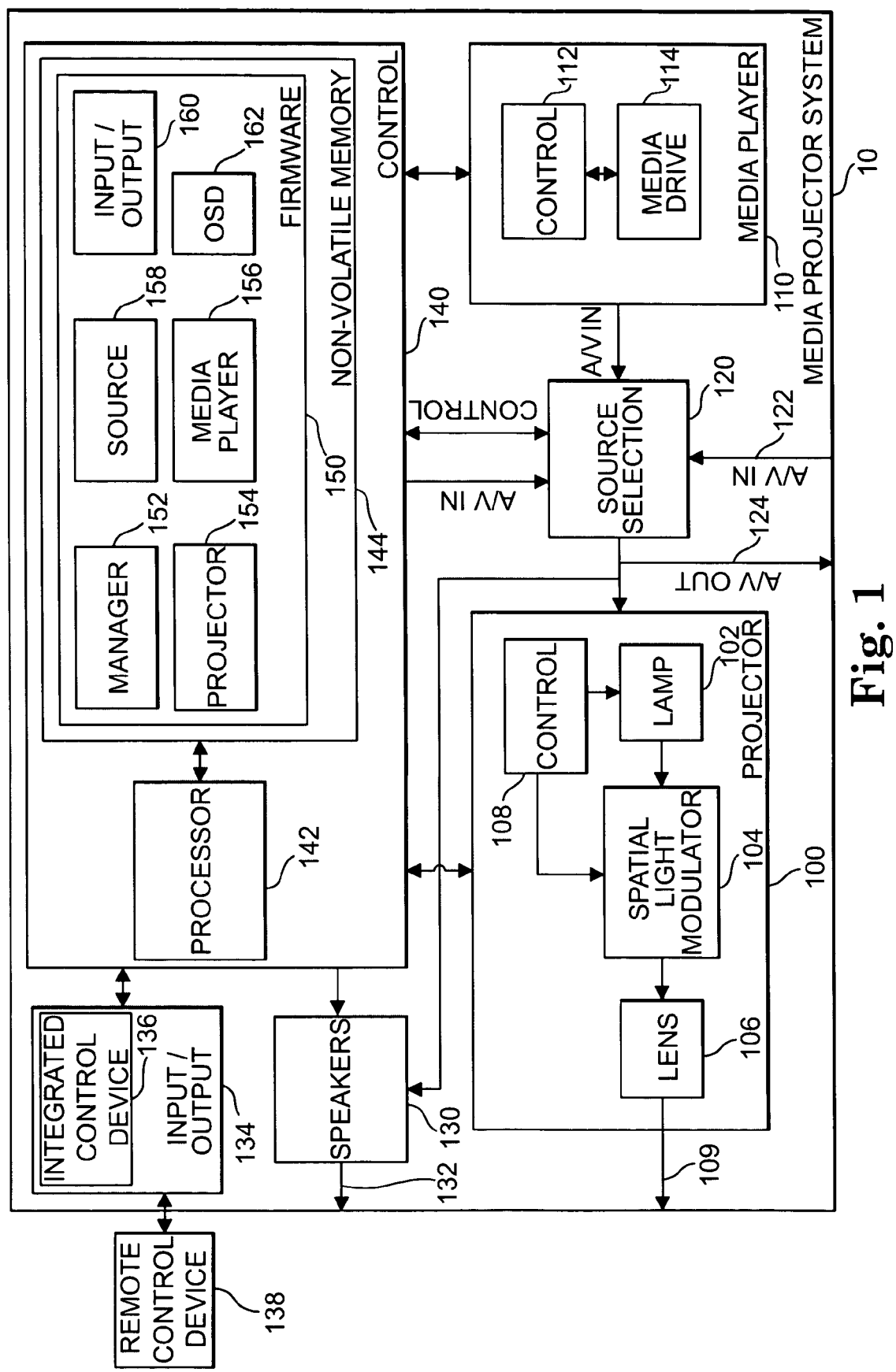
FIG. 1 is a block diagram illustrating a media projector system according to one embodiment of the present invention.

FIG. 1 is a block diagram illustrating a media projector system 10 according to one embodiment of the present invention. Media projector system 10 comprises a projector 100, a media player 110, a source selection unit 120, one or more speakers 130, an input/output unit 134, and a control unit 140. Media projection system 10, including projector 100, media player 110, source selection unit 120, speakers 130, input/output unit 134, and control unit 140, is enclosed within a housing (not shown).

Projector 100 comprises a lamp 102, a spatial light modulator 104, a lens 106, and a control unit 108. Projector 100 receives a video signal from source selection unit 120 and causes images to be displayed on a screen or other surface in response to the video signal using lamp 102, spatial light modulator 104, lens 106, and control unit 108 as indicated by an arrow 109. More specifically, lamp 102 provides a light source to spatial light modulator 104. Spatial light modulator 104 reflects selected portions of the light source through lens 106 in response to the video signal to cause images to be projected onto a screen or other surface. Control unit 108 controls the operation of lamp 102 and spatial light modulator 104. Lamp 102 may be a mercury ultra high pressure, xenon, metal halide, or other suitable projector lamp.

Figure 2A:
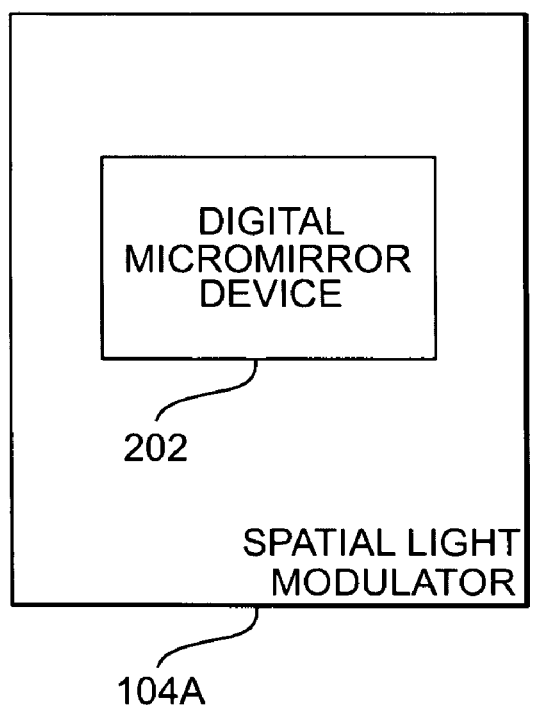
FIG. 2A is a block diagram illustrating a spatial light modulator according to one embodiment of the present invention.
Figure 2B:
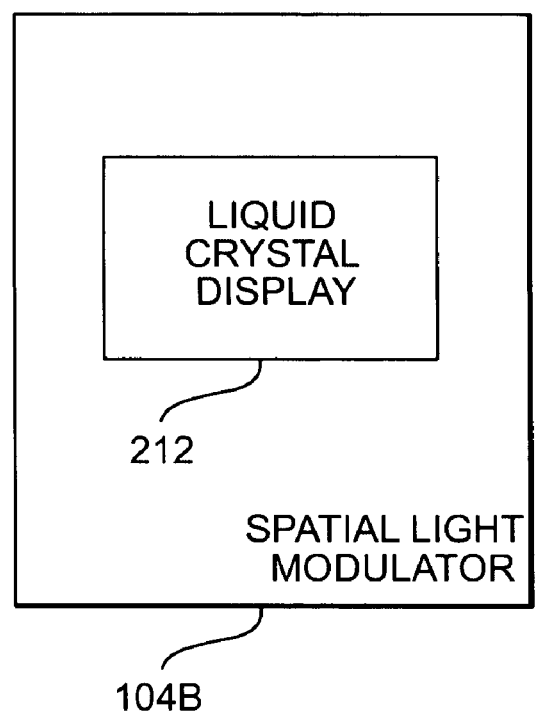
FIG. 2B is a block diagram illustrating a spatial light modulator according to one embodiment of the present invention.

As shown in FIGS. 2A and 2B, spatial light modulator 104 may comprise a digital micromirror device (DMD) or a liquid crystal display (LCD) device. FIG. 2A is a block diagram illustrating spatial light modulator 104A according to one embodiment of the present invention. FIG. 2B is a block diagram illustrating selected portions of spatial light modulator 104B according to another embodiment of the present invention. Projector 100 may comprise spatial light modulator 104A, spatial light modulator 104B, or another suitable spatial light modulator.

In the embodiment shown in FIG. 2A, spatial light modulator 104A comprises a digital micromirror device (DMD) 202. DMD 202 comprises a plurality of microscopic mirrors that are each configured to reflect or not reflect light from lamp 102. The reflected light is directed through lens 104 to form an image on a screen or other surface located remotely from projector 100.

In the embodiment shown in FIG. 2B, spatial light modulator 104B comprises a liquid crystal display (LCD) 212. LCD 212 comprises a plurality of liquid crystals configured to each transmit or block light from lamp 102. The transmitted light is directed through lens 104 to form an image on a screen or other surface located remotely from projector 100.

Projector 100 receives control signals from control unit 140 using control unit 108. Projector 100 provides information to control unit 140 using control unit 108. Control unit 108 provides control signals to lamp 102 and spatial light modulator 104. For example, control unit 108 is configured to cause lamp 102 to be turned on and off and cause power to be provided to spatial light modulator 104. Control unit 108 is also configured to detect error conditions associated with lamp 102 and spatial light modulator 104 and report error conditions to control unit 140.

Media player 110 comprises a control unit 112 and a media drive 114. Media player 110 provides media content, e.g., audio and/or visual content from a disc or other media to projector 100 and/or speakers 130 using source selection unit 120. Media drive 114 receives one or more discs or other media inserted by a user of media projector system 10. A disc may comprise a digital video disc (DVD), a compact disc (CD) (e.g., CD-ROM, CD-R, CD-RW, and CD+RW), or other disc configured to store audio and/or visual content. The audio and/or visual content may be in various formats such as DVD, CD audio, MP3, JPEG, QuickTime, RealAudio, RealVideo, and Windows Media. Media drive 114 reads the audio and/or visual content from a disc and provides the audio and/or visual content to projector 100 and/or speakers 130 through source selection unit 120.

Media player 110 receives control signals from control unit 140 using control unit 112. Media player 110 provides information to control unit 140 using control unit 112. Control unit 108 provides control signals to media drive 114.

Source selection unit 120 receives audio/video input (A/V IN) signals from media player 110, control unit 140, and an external source (indicated by an arrow 122). Source selection unit 120 provides an audio/video output (A/V OUT) to projector 100, speakers 130, and an A/V port (indicated by an arrow 124). More specifically, source selection unit 120 selects the audio/video input from media player 110, control unit 140, or the external source in response to control signals from control unit 140. Source selection unit 120 provides the selected audio/video input as the audio/video output to projector 100, speakers 130, and the A/V port. Source selection unit 120 may be configured to selectively provide the audio/video output to projector 100, speakers 130, or the A/V port.

Speakers 130 receive audio inputs from source selection unit 120 and generate audible sounds in response to the audio inputs as indicated by an arrow 132. Speakers 130 may include audio processing to modify the audio inputs for amplification by speakers 130. Speakers 130 receive control signals from control unit 140.

Input/output (I/O) unit 134 comprises one or more integrated control devices 136 and one or more ports configured to allow an external device (not shown) or a user to communicate with media projector system 10. The ports may include an infrared (IR) port configured to provide signals from a remote control device 138 for media projector unit 10 and any other suitable ports for transferring information to and/or from an external device. The integrated control devices 136 may include keypads, buttons, dials, LEDs, and any other suitable I/O devices for receiving information from and/or providing information to the user.

Control unit 140 comprises a processor 142 and a non-volatile memory 144, e.g., a flash memory. Non-volatile memory 144 comprises firmware 150 which comprises a manager module 152, a projector module 154, a media player module 156, a source module 158, an input/output module 160, and on-screen display (OSD) information 162. Firmware 150 and each module 152, 154, 156, 158, and 160 comprise instructions that are executable by processor 142 for causing functions to be performed control unit 140. On-screen display (OSD) information 162 comprises audio and/or visual content suitable for being played by speakers 130 and/or displayed by projector 100.

Control unit 140 generates control signals for controlling projector 100, media player 110, source selection unit 120, speakers 130, and I/O unit 134 in response to processor 142 executing instructions from firmware 150. More specifically, processor 142 executes manager module 152 to control the overall operation of media projector system 10 using projector module 154, media player module 156, source module 158, and input/output module 160. In addition, processor 142 executes projector module 154, media player module 156, source module 158, and input/output module 160 to control the operation of projector 100, media player 110, source selection unit 120, and I/O unit 134, respectively.

In other embodiments, control unit 140 may comprise other combinations of hardware and/or software components configured to perform the functions just described. Non-volatile memory 144 comprises one type of medium configured to store firmware 150 such that the instructions in firmware 150 may be accessed and executed by processor 142. In other embodiments, firmware 150 may be stored on other type of portable or non-portable media.

In operation, media projector system 10 operates media player 110 to delay playback of a disc in media drive 114 until projector 100 is powered-on and ready for operation. If projector 100 is not powered-on or is not ready for operation when media projector system 10 detects a disc play state, then media projector system 10 prevents media player 110 from playing a disc until projector 100 is powered-on and ready for operation.

Figure 3:
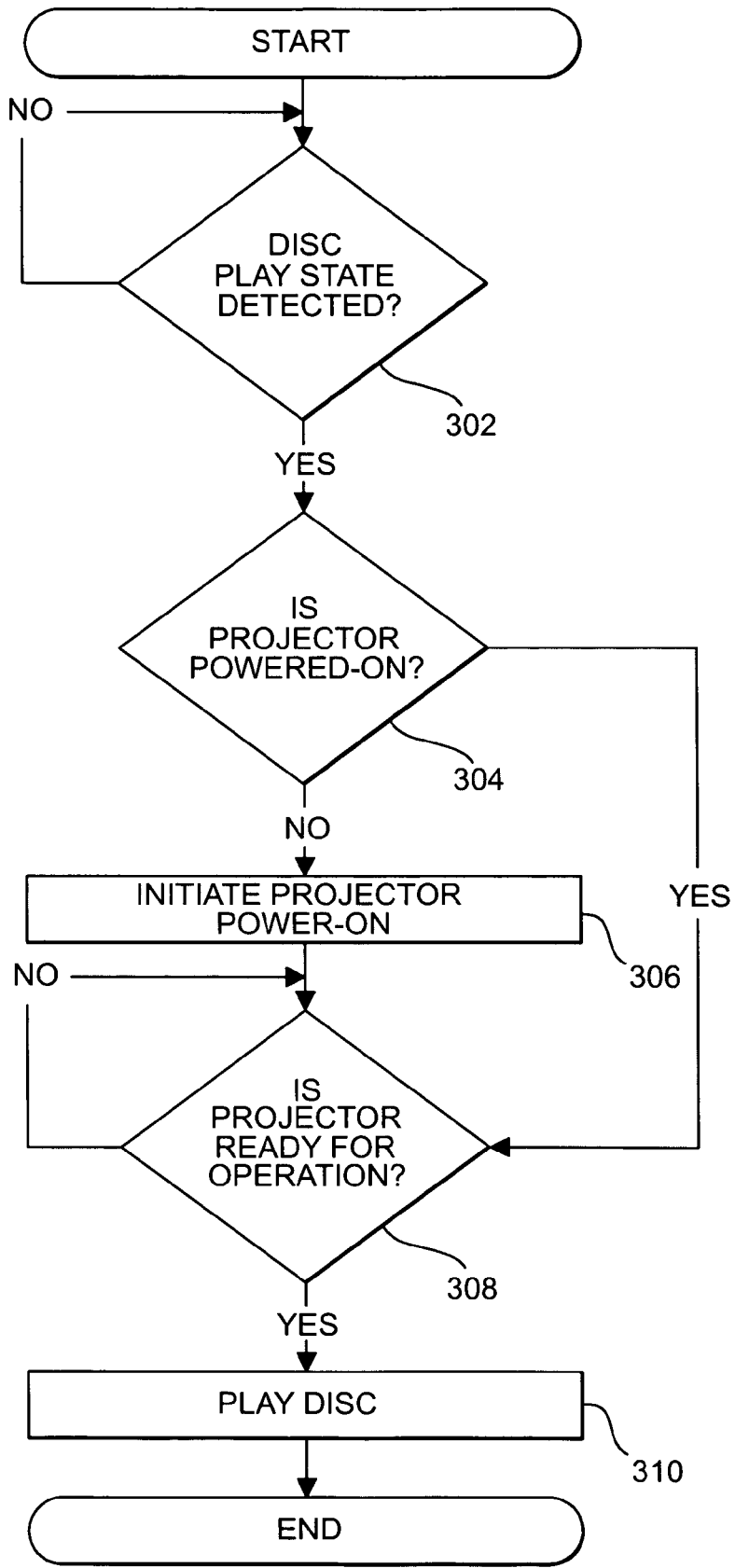
FIG. 3 is a flow chart illustrating a method for delaying playback of a disc by a media projector system according to one embodiment of the present invention.

FIG. 3 is a flow chart illustrating a method for delaying playback of a disc by media projector system 10 according to one embodiment of the present invention. In FIG. 3, a determination is made by media projector system 10 as to whether a disc play state has been detected as indicated in a block 302. The disc play state indicates that the disc in media drive 114 is to be played by media player 110 to cause the audio and/or visual content of the disc to be provided from media player 110 to projector 100 and/or speakers 130. The disc play state may be initiated in response to any number of conditions. For example, the disc play state may be initiated in response to the disc being inserted into media drive 114. The disc play state may also be initiated in response to a user input from I/O unit 134 that requests that the disc in media player 110 be played. The user input may be received from integrated control device 136 or remote control device 138.

If a disc play state has not been detected, then media projector system 10 repeats the function of block 302 at a later time. If a disc play state has been detected, then a determination is made by media projector system 10 as to whether projector 100 is powered-on as indicated in a block 304. If projector 100 is not powered-on, then media projector system 10 initiates a power-on of projector 100 as indicated in a block 306. By initiating a power-on of projector 100, each sub-system of projector 100 including lamp 102, spatial light modulator 104, and control unit 108 are powered-on and/or initialized. In particular, control unit 108 turns on or strikes lamp 102 to begin the process of illuminating lamp 102.

If projector 100 is powered-on or has been powered-on by media projector system 10 as indicated in block 306, then a determination is made by media projector system 10 as to whether projector 100 is ready for operation as indicated in a block 308. In response to being powered-on, projector 100 may take an amount of time to become ready for operation. Projector 100 becomes ready for operation in response to each sub-system of projector 100 indicating that it is ready for operation. When each sub-system is ready for operation, projector 100 is capable of projecting images onto a screen or other surface without distortion or other ill effects that may occur prior to one or more sub-systems of projector 100 (e.g., lamp 102) being fully warmed-up. In particular, lamp 102 becomes ready for operation subsequent to being turned on or struck when it reaches its full illumination.

If projector 100 is not ready for operation, then media projector system 10 repeats the function of block 308 at a later time. If projector 100 is ready for operation, then media projector system 10 plays the disc as indicated in a block 310. By playing the disc, media player 110 generates a video signal that is provided to projector 100. Accordingly, the display of visual content of the disc by projector 100 is delayed until projector 100 is powered-on and ready for operation.

The internal operation of media projector system 10 in delaying playback of a disc until projector 100 is powered-on and ready for operation will now be described according to one embodiment. In particular, the operation of control unit 140 will be described with respect FIG. 4, and the operation of media player 110 will be described with respect FIG. 5.

Figure 4:
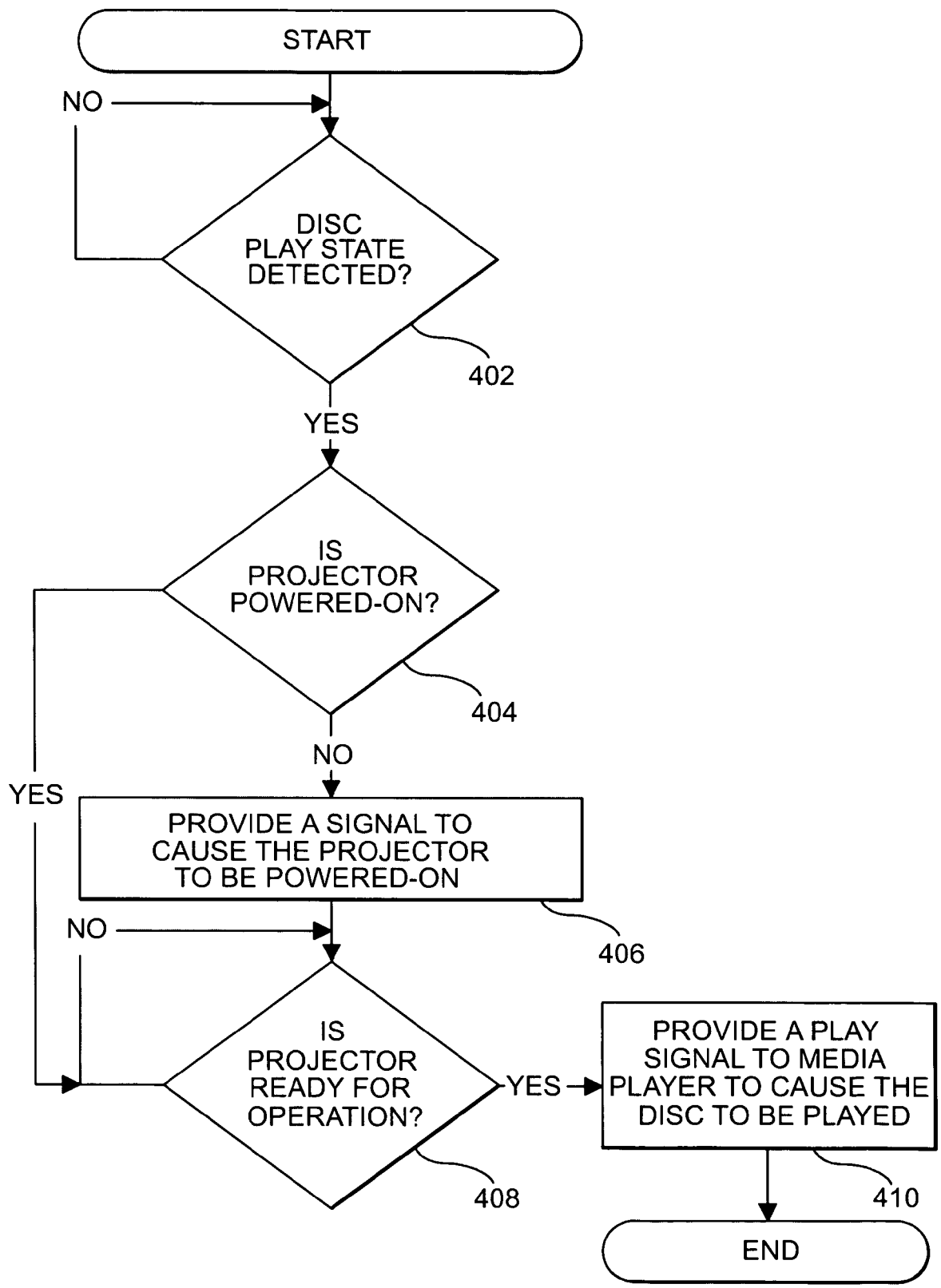
FIG. 4 is a flow chart illustrating a method for controlling the delay of playback of a disc in a media projector system according to one embodiment of the present invention.

FIG. 4 is a flow chart illustrating a method for controlling the delay of playback of a disc in media projector system 10 according to one embodiment of the present invention. In FIG. 4, a determination is made by control unit 140 as to whether a disc play state has been detected as indicated in a block 402. Control unit 140 detects a disc play state in response to input/output module 160 detecting a user input from I/O unit 134 that requests that the disc in media player 110 be played, e.g., by a user pressing a play button on integrated control device 136 or remote control device 138. Input/output module 160 provides a notification to manager module 152 in response to detecting a disc play state. Control unit 140 also detects a disc play state in response to media player module 156 receiving a disc play notification from media player 110 where a user has inserted a disc into media drive 114. Media player module 156 provides a notification to manager module 152 in response to detecting a disc play state.

If a disc play state has not been detected, then control unit 140 repeats the function of block 402 at a later time. If a disc play state has been detected, then a determination is made by control unit 140 as to whether projector 100 is powered-on as indicated in a block 404. More specifically, manager module 152 accesses information that indicates the on/off state of projector 100. In one embodiment, the information is stored in non-volatile memory 144 or another memory (not shown) accessible by control unit 140. In another embodiment, manager module 152 causes projector module 154 to access the information by communicating with control unit 108.

If projector 100 is not powered-on, then control unit 140 provides a signal to projector 100 to cause projector 100 to be powered-on as indicated in a block 406. More specifically, manager module 152 causes projector module 154 to provide a signal to control unit 108 to cause each sub-system of projector 100 including lamp 102, spatial light modulator 104, and control unit 108 to be powered-on. If projector 100 is powered-on or has been powered-on by control unit 140 as indicated in block 406, then a determination is made by control unit 140 as to whether projector 100 is ready for operation as indicated in a block 408. As noted above, projector 100 becomes ready for operation in response to each sub-system of projector 100 indicating that it is ready for operation. Manager module 152 accesses information that indicates the readiness state of projector 100. In one embodiment, the information is stored in non-volatile memory 144 or another memory (not shown) accessible by control unit 140. In another embodiment, manager module 152 causes projector module 154 to access the information by communicating with control unit 108. The readiness state may indicate that projector 100 is ready for operation or that projector 100 is warming-up, for example.

If projector 100 is not ready for operation, then control unit 140 repeats the function of block 408 at a later time. If projector 100 is ready for operation, then control unit 140 provides a play signal to media player 110 to cause the disc to be played as indicated in a block 410. Accordingly, control unit 140 prevents media player 140 from playing a disc by until control unit 140 provides a play signal to media player 110. Control unit 140 provides the play signal to media player 110 in response to lamp 102 being turned on and ready.

In an alternate embodiment of the method shown in FIG. 4, control unit 140 may wait for a defined period of time between detecting that projector 100 is not powered-on in block 404 and providing the signal to cause media player 110 to play the disc in block 410. By delaying for the defined period of time in this embodiment, control unit 140 allows projector 100 to be powered-on and warm-up prior to causing media player 110 to play the disc.

Figure 5:
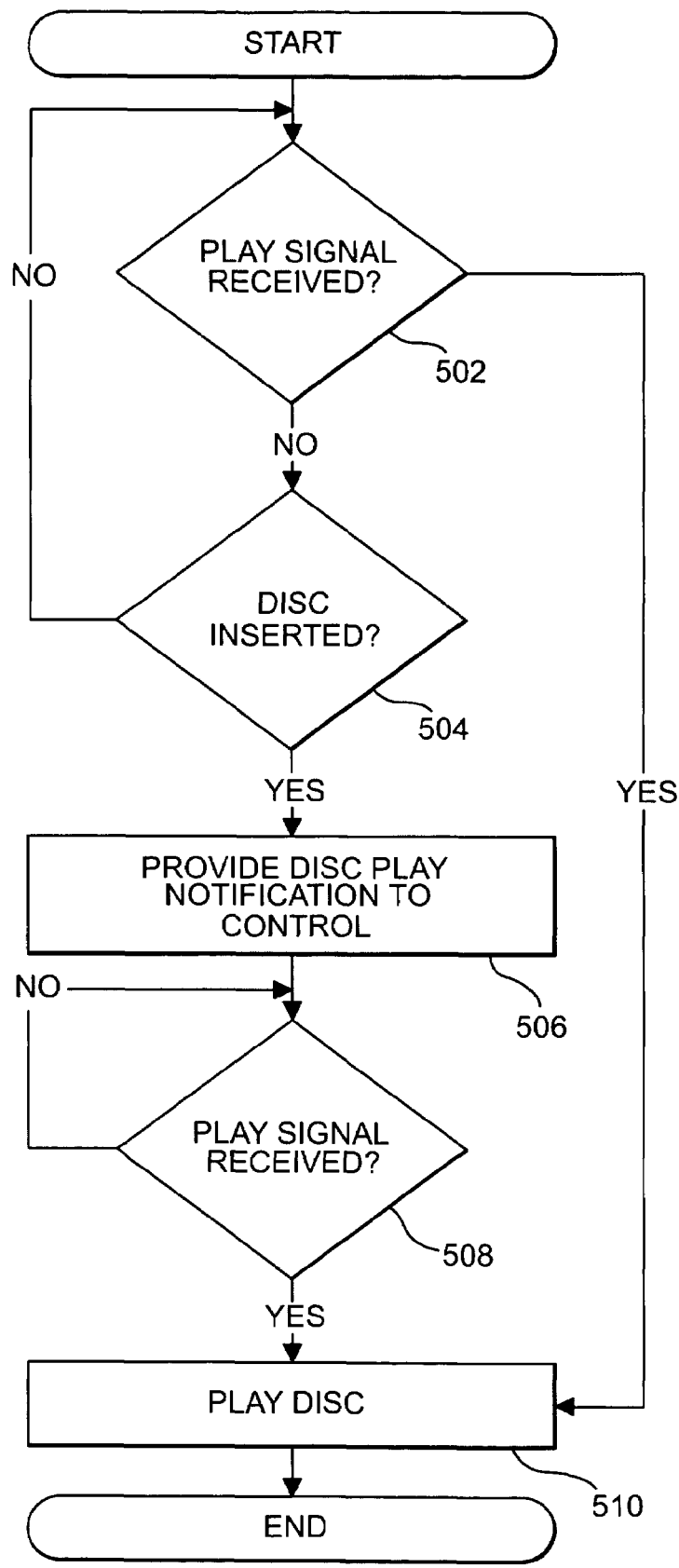
FIG. 5 is a flow chart illustrating a method for delaying playback of a disc in a media player according to one embodiment of the present invention.

FIG. 5 is a flow chart illustrating a method for delaying playback of a disc in media player 110 according to one embodiment of the present invention. In FIG. 5, a determination is made by media player 110 as to whether a play signal has been received from control unit 140 as indicated in a block 502. If a play signal has been received, then media player 110 plays a disc in media drive 114 as indicated in a block 510. By playing the disc, media player 110 generates a video signal that is provided to projector 100. In response to receiving the video signal, projector 100 displays images associated with the video signal onto a screen or other surface.

If a play signal has not been received, then a determination is made by media player 110 as to whether a disc has been inserted into media drive 114 as indicated in a block 504. If a disc has not been inserted into media drive 114, then media player 110 repeats the function of block 502 at a later time. If a disc has been inserted into media drive 114, then media player 110 provides a disc play notification to control unit 140 as indicated in a block 506. Media player 110 provides the disc play notification to control unit 140 to indicate that a play disc state has been detected.

After providing the disc play notification, a determination is made by media player 110 as to whether a play signal has been received from control unit 140 as indicated in a block 508. If a play signal has been received, then media player 110 plays the disc in media drive 114 as indicated in the block 510. If a play signal has not been received, then media player 110 repeats the function of block 508 at a later time. Accordingly, media player 110 delays playback of a disc in media drive 114 until media player 110 receives a play signal from control unit 140.

Embodiments described herein may provide advantages over prior solutions. For example, a media player may be prevented from providing a visual content to a projector before the projector is ready to display images associated with the content.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system comprising:
    a media player configured to play media content;
    a projector operatively coupled to the media player; and
    a first control unit operatively coupled to the media player and the projector;
    wherein the first control unit is configured to cause the projector to be powered-on in response to determining that the projector is not powered-on and in response to detecting a play state associated with the media player, and wherein the first control unit is configured to prevent the media player from playing the media content until the projector is powered-on and ready for operation.

2. The system of claim 1 wherein the projector comprises a second control unit, and wherein the first control unit is configured to provide a first signal to the second control unit to cause the projector to be powered-on in response to detecting that the projector is not powered-on.

3. The system of claim 2 wherein the media player comprises a third control unit configured to cause media player to play the media content, and wherein the first control unit is configured to provide a second signal to the third control unit to cause the media content to be played subsequent to providing the first signal to the second control unit.

4. The system of claim 1 wherein the projector comprises a lamp and a spatial light modulator, and wherein the first control unit is configured to determine that the projector is ready for operation in response to determining that the lamp is fully illuminated.

5. The system of claim 4 wherein the spatial light modulator comprises a digital micromirror device (DMD).

6. The system of claim 4 wherein the spatial light modulator comprises a liquid crystal display (LCD) device.

7. The system of claim 1 wherein the media content comprises a digital video disc (DVD).

8. The system of claim 1 further comprising:
a speaker operatively coupled to the media player.

9. The system of claim 1 further comprising:
an input/output unit operatively coupled to the first control unit;
wherein the input/output unit is configured to receive a signal from a remote control device.

10. The system of claim 1 further comprising:
a source selection unit operatively coupled to the media player, the first control unit, and the projector;
wherein the source selection unit is configured to provide a first signal from the media player to the projector in response to a second signal from the first control unit.

11. A system comprising:
a media player configured to play a disc;
a projector operatively coupled to the media player and including a lamp; and
a first control unit operatively coupled to the media player and the projector;
wherein the first control unit is configured to determine whether the lamp is fully illuminated, and wherein the first control unit is configured to prevent the media player from playing the disc until the lamp is fully illuminated.

12. The system of claim 11 wherein the first control unit is configured to determine whether the lamp is fully illuminated in response to detecting a disc play state.

13. The system of claim 11 wherein the first control unit is configured to cause the projector to be powered-on in response to detecting that the projector is not powered-on.

14. The system of claim 11 wherein the projector comprises a second control unit, and wherein the first control unit is configured to provide a first signal to the second control unit to cause the projector to be powered-on in response to detecting that the projector is not powered-on.

15. The system of claim 14 wherein the first control unit is configured to provide the first signal to the second control unit to cause the projector to be powered-on in response to detecting a disc play state.

16. The system of claim 14 wherein the media player comprises a third control unit configured to cause the disc to be played, and wherein the first control unit is configured to provide a second signal to the third control unit to cause the disc to be played subsequent to providing the first signal to the second control unit.

* * * * *